Nov. 1, 1955  T. O. SUMMERS, JR  2,722,127
GRAVITY ERECTED GYROSCOPE
Filed Nov. 12, 1952  4 Sheets-Sheet 1

THOMAS O. SUMMERS, JR.
INVENTOR.

BY R. E. Geanque

ATTORNEY

THOMAS O. SUMMERS, JR.
INVENTOR.

BY R. E. Geaugne
ATTORNEY

Nov. 1, 1955 T. O. SUMMERS, JR 2,722,127
GRAVITY ERECTED GYROSCOPE
Filed Nov. 12, 1952 4 Sheets-Sheet 3

THOMAS O. SUMMERS, JR.
INVENTOR.

BY R. E. Geauque
ATTORNEY

Nov. 1, 1955 T. O. SUMMERS, JR 2,722,127
GRAVITY ERECTED GYROSCOPE
Filed Nov. 12, 1952 4 Sheets-Sheet 4

THOMAS O. SUMMERS, JR.
INVENTOR.

BY R. E. Geanque

ATTORNEY

United States Patent Office 2,722,127
Patented Nov. 1, 1955

2,722,127

GRAVITY ERECTED GYROSCOPE

Thomas O. Summers, Jr., Sherman Oaks, Calif.

Application November 12, 1952, Serial No. 320,090

24 Claims. (Cl. 74—5.45)

This invention relates to a gyroscope for use with moving craft in which a gravity sensitive device brings about erecting movements on the gyroscope rotor to erect the spin axis thereof into alignment with the vertical.

By the present invention it is proposed to provide an improved mechanism to erect the spin axis of the gyro into alignment with the vertical about both the pitch and the roll axis of the craft. To this end an erecting mechanism similar to that described in United States Patent No. 2,635,469, granted April 21, 1953, to Thomas O. Summers, Jr., is utilized except that a novel method is proposed for gravity erecting the spin axis in roll rather than case erecting the spin axis in roll as in the previous device.

While gravity erection of the spin axis in roll has certain disadvantages as compared with case erection, it also has certain advantages which will now be considered. In airplanes which are not automatically trimmed in roll or in craft having no trim tab about the roll axis, it is frequently necessary to fly a straight course with a wing down. Under such conditions, if the spin axis of the gyro were case erected or, in other words, erected to a position normal to the wings of the craft, the spin axis would not necessarily parallel the vertical line in space, and only in the event that the aircraft flew straight with its wings level would the spin axis be case erected into true vertical. Hence, it is desirable to provide a method for erecting the spin axis of the reference gyro into a position parallel to the vector sum of the aerodynamic lift forces of the airplane or, in other words, into alignment with true vertical. In conventional gyro verticals and also in the present invention, this is accomplished through the expedient of a gravity sensitive erector.

It should be emphasized, however, that there is very little difference between gravity erection and case erection in roll and only in the event the airplane flew straight with the wings inclined is there any difference whatever in operating principles. Therefore, there is no need for extending the gravity erection beyond the maximum inclination or deviation of the wing that is expected to be encountered in flight because of out-of-trim and loading conditions. For instance, it should never be necessary to displace the wings more than several degrees in order to fly the aircraft on a straight course and thus, it may be seen that there is no need to provide gravity erection beyond this angle.

In previous devices having gravity erection in roll, it has been considered necessary to provide gravity erection in roll throughout a large angle about the roll axis and complicated and expensive arrangements have been necessary to obtain this end. These disadvantages are eliminated in the present invention since gravity erection is provided only throughout a small angle slightly exceeding the expected maximum deviation of the wings from the horizontal in order to fly straight. Beyond this small angle, case erection is provided since, except for out-of-trim conditions, case erection and gravity erection are full mechanical equivalents.

The gyroscope of the present invention is equipped with a single gravity sensitive bail pivoted about the pitch axis of the aircraft and this bail carries a gravity sensitive carriage which is free to move along the bail in response to the pull of gravity. The gravity sensitive erector for the gyroscope is mounted on the carriage so that it can erect the spin axis of the gyroscope to true gravity vertical regardless of the position of the wing corresponding to straight flight. It has been found desirable to provide the gyroscope of this invention with damping means, such as a dashpot, for preventing hunting of the gravity sensitive erector. Also, it is possible to provide means for disengaging the gravity erecting device during turning of the aircraft to prevent unnecessary erection of the gyroscope.

It is therefore an object of the present invention to provide a gyroscope which is gravity erected about the roll axis only through a small angle about the roll axis.

A further object of the invention is to provide for gravity erection of the gyroscope through an angle about the roll axis approximately equal to the maximum deviation of the wing from horizontal required to maintain straight flight.

Another object of the invention is the provision of a gyroscope which is gravity erected in roll through a small angle about the roll axis corresponding to the maximum deviation of the wings from horizontal to maintain straight flight and which is also gravity erected about the pitch axis.

A still further object of the invention is to provide a novel erector for gravity erecting the spin axis of the gyroscope, which erector is carried by a single bail pivotally mounted about the pitch axis of the aircraft. If so desired, it can be provided that the erector can be disengaged during turning of the craft.

Another object is to provide a novel means of mounting a gyroscope erector which comprises a gravity sensitive carriage mounted by a gravity sensitive bail so that the erector is gravity sensitive about two axes.

These, and other objects of the invention not specifically enumerated above, will become readily apparent from the following specification and drawings in which.

Figure 1:
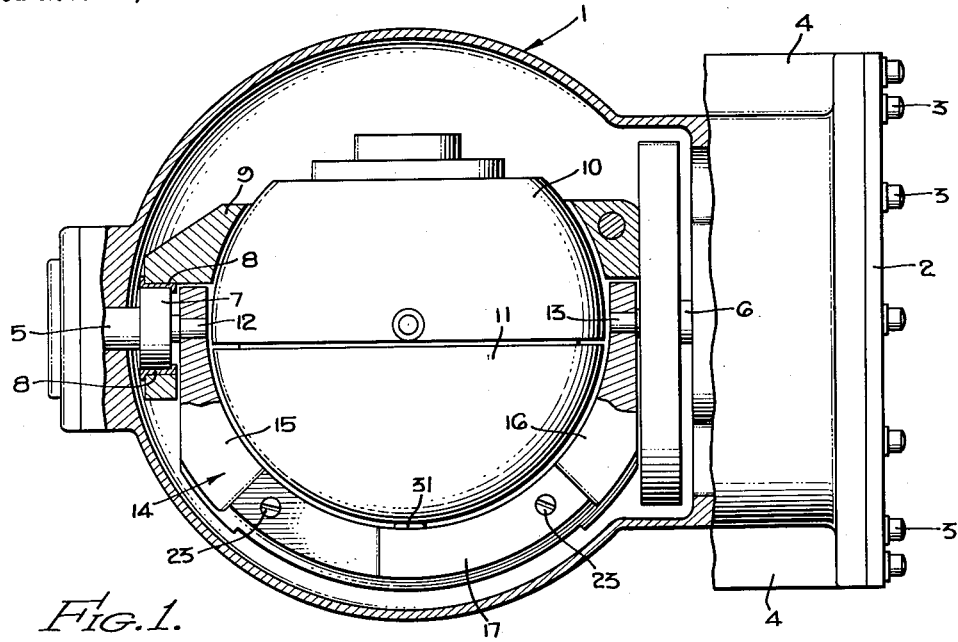
Fig. 1 is an elevational view of the gyroscope of this invention with a part of the casing removed to illustrate the mounting gimbals.
Figure 2:
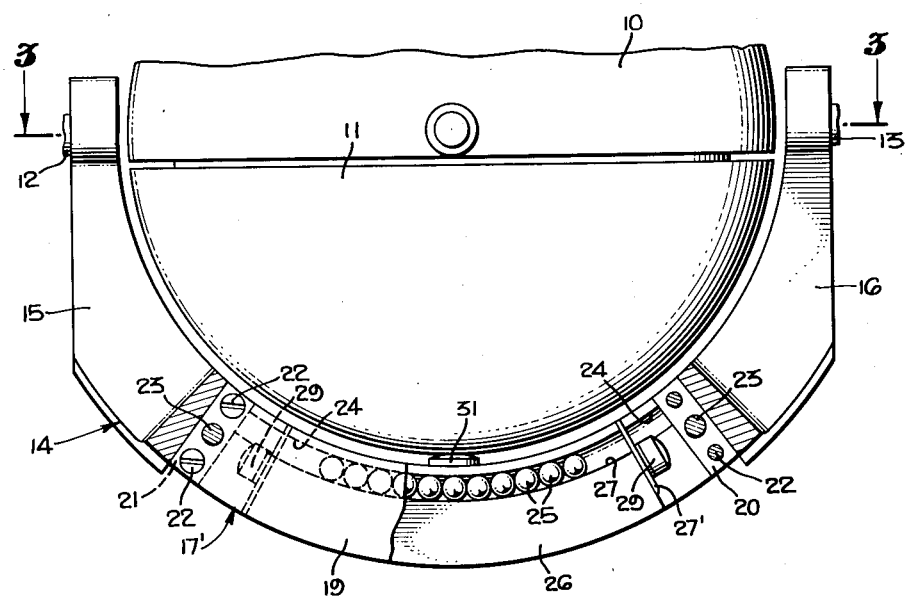
Fig. 2 is an elevational view partly in cross-section showing the relationship of the gravity sensitive erector to the dome of the rotor.
Figure 3:
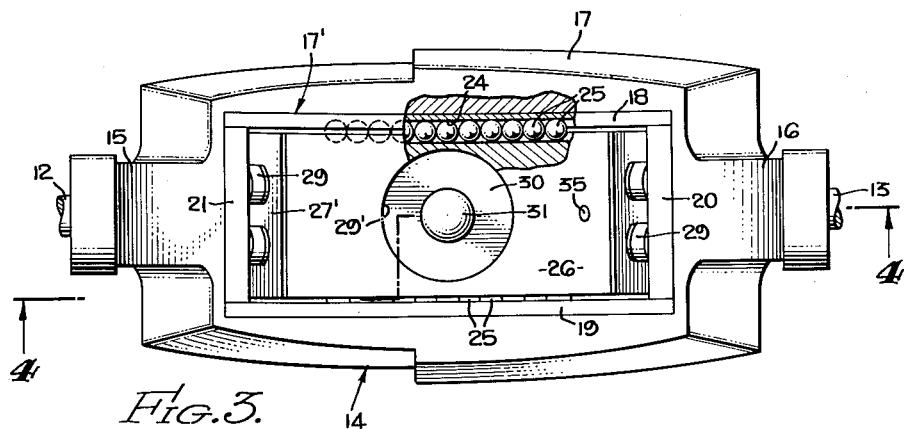
Fig. 3 is a top plan view partly in section taken along line 3—3 of Fig. 2 showing the gravity sensitive erector mounted in the bail.

The embodiment of the invention illustrated in Figs. 1 through 5 comprises a casing 1 having an opening at one end which is closed by a plate 2 secured by screws 3 to the casing. The casing is rigidly supported by flanges 4 within the aircraft so that Fig. 1 is transverse to the direction of flight. Shafts 5 and 6 are rigidly supported by the casing and have bearings 7 (only one of which is shown) positioned within retainers 8. The outer gimbal ring 9 has openings for receiving retainers 8 so that the outer gimbal ring is pivotally supported by shaft 5 and 6 for movement about the pitch axis of the aircraft.

The inner gimbal ring 10 is pivotally mounted on outer gimbal ring 9 by bearing (not shown) so that its pivotal axis is perpendicular to the axis of shafts 5 and 6 and lies along the roll axis of the aircraft. An electrically driven motor (not shown) is mounted within the inner gimbal ring to drive the gyro rotor and a dome 11 is secured to the rotor for rotation therewith. Thus, the gyro rotor is universally mounted and can be used to adjust the usual pitch and roll references contained within the casing 1.

The shafts 5 and 6 have reduced end portions 12 and 13 respectively which serve as bearing supports for the pendulous bail 14 so that the bail is free to move about the pitch axis of the aircraft. The bail has arms 15 and 16 and an enlarged portion 17 which contains a rectangular opening for receiving a frame 17' comprised of sides 18 and 19 and ends 20 and 21. This frame is of the same height and curvature as the portion 17 of the bail so that it does not project beyond the surface of the bail and thus follows the contour of the dome 11.

Prior to being inserted into the rectangular opening, the sides and ends of the frame are secured together by means of screws 22 which pass longitudinally through the ends 20 and 21. After the frame is inserted into the bail, it is secured to portion 17 by means of four screws 23 located at each corner of the frame. These screws pass through portion 17 and through the sides of the frame and are threaded into ends 20 and 21.

The sides 18 and 19 each have an interior groove 24 which is curved to follow the contour of the bail 14 and each of the grooves receive a plurality of ball bearings 25. A carriage 26 is positioned within the opening in frame 17' and is provided with a groove 27 on each side, which grooves cooperate with grooves 24 in sides 18 and 19 in order to guide the ball bearings. A plate 27' is mounted on each end of the carriage by a pair of screws 29 and the ends of these plates serve to retain the ball bearings within the grooves. Thus, the carriage 26 is free to move back and forth relative to the bail in a direction about the roll axis of the aircraft. The carriage is curved along its length to follow the contour of dome 11 and the ends of the carriage have the same inclination as the ends 20 and 21. A pair of openings 28 are positioned in each of the end portions 20 and 21 to receive the heads of screws 29 so that the screw heads will not interfere with the movement of the carriage.

The carriage 26 is a gravity sensitive mass which is free to move relative to the bail about the roll axis of the aircraft. The length of the opening in frame 17' is somewhat greater than the length of carriage 26 and this difference in length determines the amount of relative movement that can take place. In the modification being described, the carriage 26 has a center opening 29' which receives a mass 30 and this mass is freely slideable in the opening. A friction erector 31 is mounted in the upper surface of the mass 30 and the under surface of the mass has a groove 32 which receives one end of leaf spring 33. The other end of the leaf spring is secured to one of the plates 27' and the spring is bent so as to lie along groove 34 in the bottom of carriage 26. A screw 35 positioned in groove 34, passes through spring 33 and is threaded into an opening in the under side of the carriage. The spring 33 serves to press the erector 21 into contact with the surface of dome 11 and the force of the spring can be adjusted by turning screw 35. Normally, the mass 30 is subject only to gravitational force and the upward force of spring 33 is set to just overcome this gravitational pull and maintain the contact between the erector and the dome.

The action of the erector 31 in precessing the gyroscope is the same as disclosed in the previously mentioned patent application in that when the erector is displaced from a position directly in line with the spin axis of the rotor, the gyro will be precessed toward the erector. It is understood that the curvature of the bail and carriage is substantially the same as that of dome 11 so that the erector can move relative to the dome and still maintain contact with the dome.

Figure 4:
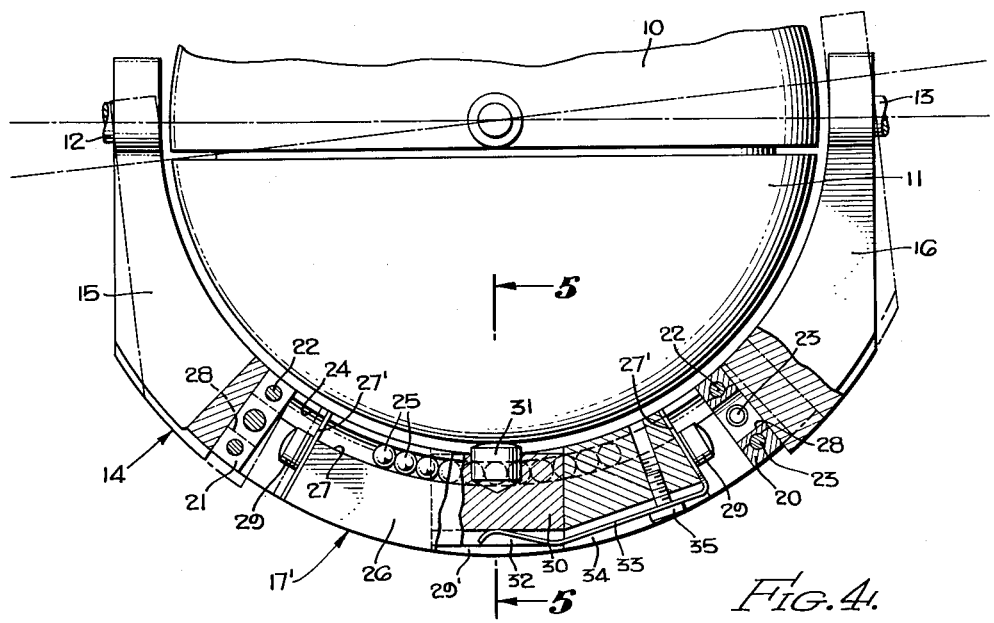
Fig. 4 is a vertical sectional view along line 4—4 of Fig. 3 illustrating the manner in which the erector is mounted so as to be sensitive to turning of the aircraft.
Figure 5:
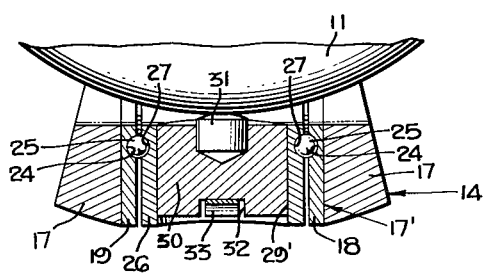
Fig. 5 is a transverse vertical section along line 5—5 of Fig. 4 illustrating the erector mounted in the gravity sensitive carriage.

Since the bail 14 is gravity sensitive about the pitch axis of the aircraft, the erector 31 will erect the gyro to gravity vertical about the pitch axis. Also, since the carriage 26 is free to move about the roll axis in response to the gravitational force, the gyroscope will be also erected to gravity vertical about the roll axis. The amount by which the carriage is free to move relative to the bail about the roll axis is slightly greater than that required to permit gravity erection in roll of those aircraft having maximum deviation of the wings from horizontal in order to fly straight. The position of the carriage relative to the bail when this maximum wing deviation is encountered is illustrated in Fig. 4 where the bail is shown in dashed lines in a position corresponding to straight flight of the out-of-trim aircraft. It is pointed out that it is preferable to have clearance between the carriage and the end 21 even in this maximum condition.

The operation of this modification of the invention will now be described. When the aircraft is in straight flight, the erector 31 will erect the spin axis of the gyroscope to gravity vertical about both the roll and pitch axis of the aircraft. Gravity erection in roll is possible since it is provided that carriage 26 will be gravity sensitive when the aircraft is in its straight flight attitude about the roll axis. Thereafter, any change in roll or pitch attitude of the aircraft will be corrected for by the control system of the gyroscope. When the aircraft is placed in a turn by the operator, the bail 14 will move about the roll axis with the aircraft and the carriage 26 will remain gravity erected since the position of the carriage will be determined by the resultant of gravity and centrifugal forces acting on the carriage. Thus, the carriage will not be in contact with either of ends 20 or 21 during a turn but will move in the same direction as the bail.

Because of this movement of the carriage away from true gravity vertical about the roll axis during a turn the erector would normally tend to precess the spin axis of the gyro away from true vertical about the roll axis if it remained in contact with the dome. However, the acceleration force acting on mass 30 during a turn plus the gravitational force normally acting on mass 30 is sufficient to overcome the force of spring 33 and, thus, the mass 30 and erector 31 will be moved away from dome 11 and the erector will not continue to erect the gyroscope away from true vertical about the roll axis. After the aircraft has been placed back on a straight course following a turn, the spring 33 will move erector 31 back into contact with the dome 11 so that the gyroscope will again be gravity erected about both the roll and pitch axis in the same manner as before the turn. The disengagement of the erector during turning has the advantage that there will be no appreciable displacement of the spin axis about the roll axis during the turn which would later show up as a pitch error after the turn.

Figure 6:
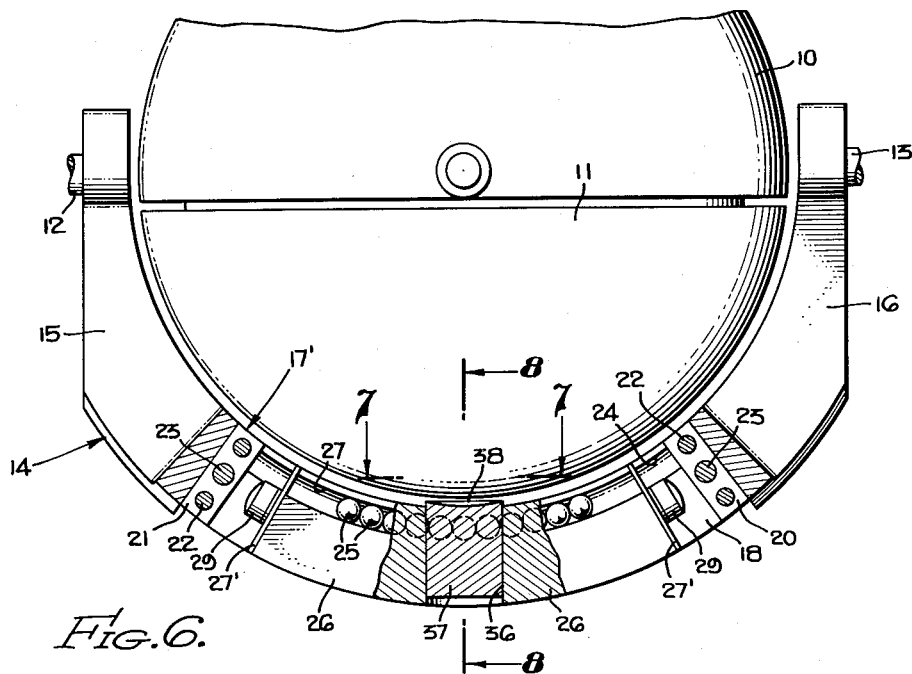
Fig. 6 is a side elevational view of a modified form of the invention in which the erector is not disengaged during turning of the aircraft.
Figure 7:
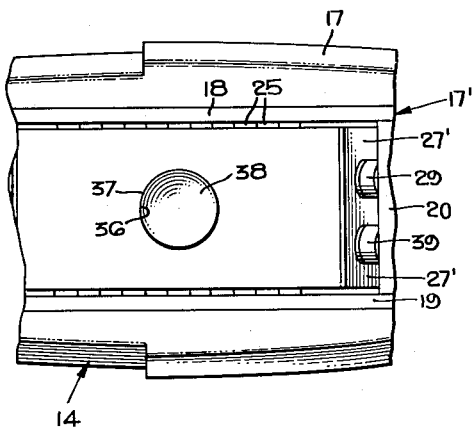
Fig. 7 is a top view of the gravity sensitive carriage taken along line 7—7 of Fig. 6.
Figure 8:
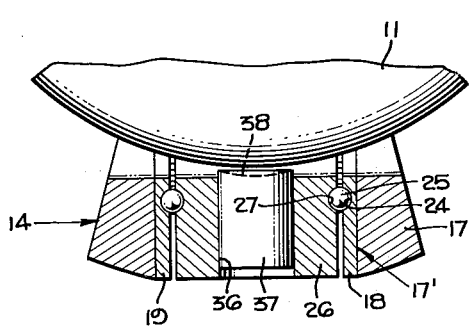
Fig. 8 is a transverse vertical section along line 8—8 of Fig. 6 showing the mounting for the erector of the modified form shown in Fig. 6.

It is preferable to have the erector become inoperative during turning of the aircraft but erectors which continually coact with the dome during turning can be used. The modification shown in Figures 6 through 8 illustrates the use of a continuously acting erector of the magnetic type. In Figures 6 through 8, the same reference numerals indicate like parts as in the modification previously described. The carriage 26 has an opening 36 for rigidly mounting a circular permanent magnet 37. One end 38 of the magnet has a curvature similar to that of the dome 11 and this end is placed closely adjacent to the dome so that a magnetic drag will be produced on the area of the dome opposite the end 38.

The magnetic erector 37 functions in the same manner as friction erector 31 in that the gyro is precessed until the spin axis of dome 11 is directly over erector 37 and the position of the spin axis will tend to follow the erector. Since the coaction of the erector 37 with the dome is continuous during turning of the aircraft, there is a tendency for erector 37 to move the spin axis of the dome away from true gravity vertical during turns. However, when the aircraft is straightened out after a turn, the spin axis will be erected to gravity vertical again since carriage 26 becomes responsive to only gravity during straight flight. For turns of short duration, there will not be time for any substantial displacement of the spin axis by the erector. During straight flight, erector 37 serves to continually erect the gyroscope to true gravity vertical about the roll and pitch axis in the same manner as the modification previously described except that the drag on the dome will be magnetic rather than frictional. The carriage 26 will be positioned during turning in the same manner in both modifications.

Figure 9:
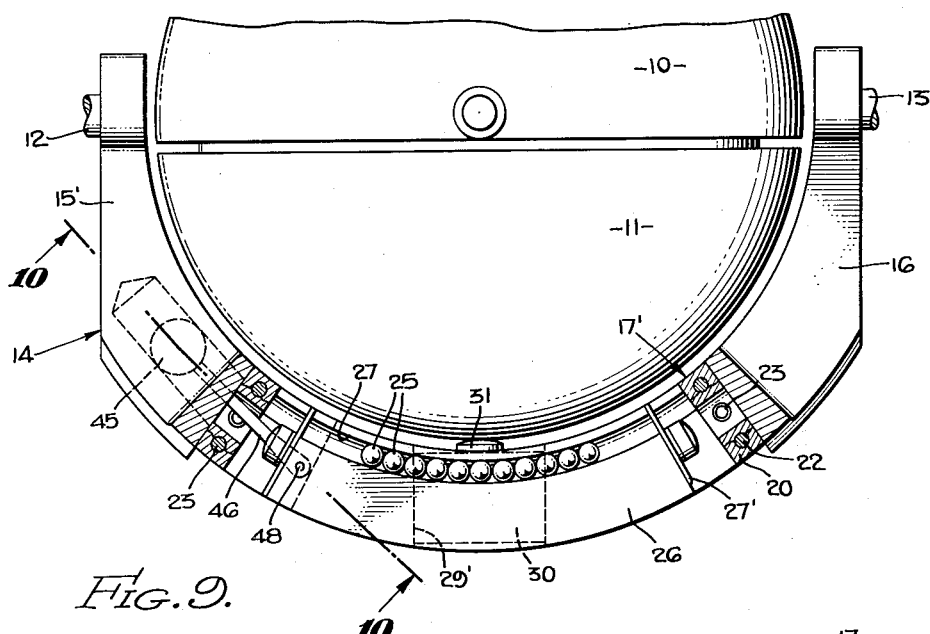
Fig. 9 is an elevational view partly in cross-section of another modification illustrating the damper device for the erector carriage.
Figure 10:
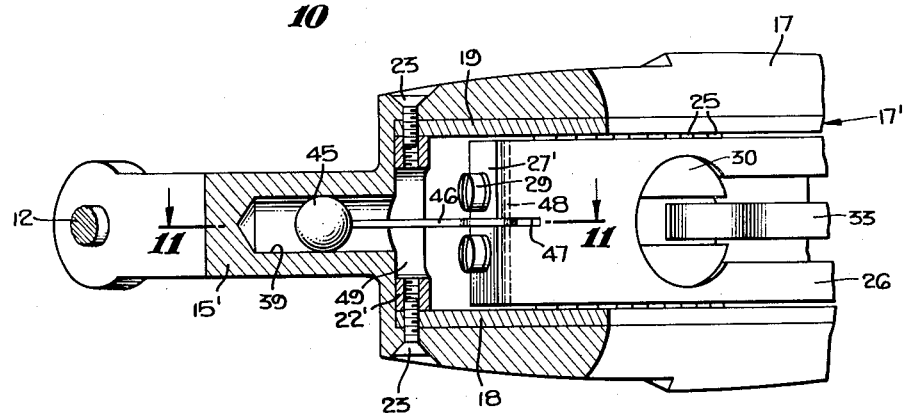
Fig. 10 is a sectional view along line 10—10 of Figure 9 showing the dashpot construction.
Figure 11:
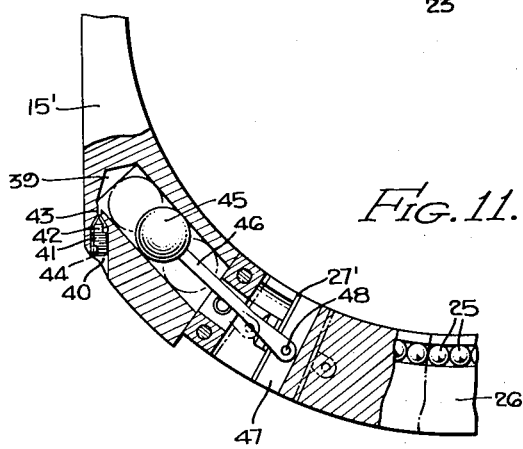
Fig. 11 is a sectional view along line 11—11 of Fig. 10 wherein various positions of the dashpot are illustrated.

The modification of the invention illustrated in Figures 9 through 11 comprises an erecting device identical with that shown in Figures 1 through 5, which has a damping means to smooth out the movements of the gravity sensitive carriage. Parts identical with those in Figures 1 through 5 are designated with like reference numerals. The arm 15' of bail 14 contains a cylinder 39 which has a passage 40 connecting one end of the cylinder to atmosphere. The passage 40 is threaded to receive screw 41 which carries valve element 42 for controlling the flow of air through restricted passage 43. The screw 41 also has a passage 44 connecting passage 43 with atmosphere. The cylinder 39 contains a closely fitted sphere 45 which is attached to one end of arm 46. The other end of arm 46 is positioned in slot 47 in one end of carriage 26 and is pivotally secured to the carriage by means of pin 48 passing through the carriage and the slot 47. The end 22' has a single continuous opening 49 to allow space for relative movement of the arm 46.

During the operation of this modification, the carriage 26 is free to move so that the friction erector 31 will erect the spin axis of the dome 11 to true gravity vertical during straight flight. The damping means serves to prevent uneven movements of the carriage with respect to the bail 11 and the position of the carriage will not be substantially effected by fast rolling movement of the aircraft.

The positions of the sphere 45 and arm 46 corresponding to several different positions of the carriage 26 are illustrated by dashed lines in Figure 11. The movement of the sphere toward the closed end of cylinder 39 will force air through restricted passage 43 and out to atmosphere whereas movement of the sphere away from the closed end will draw air through restricted passage 43. Thus, relative movement of the carriage in either direction will be damped and the amount of damping can be adjusted by varying the position of screw 41. Except for this damping, the operation of this modification will be the same as that of the modification illustrated in Figures 1 through 5.

It is understood that in all the modifications, the spin axis of the gyroscope is continually erected to gravity vertical about the pitch axis regardless of the position of the carriage relative to the bail, providing of course, that the erector is acting upon dome 11. This invention provides a very simple and effective means of erecting a gyroscope to gravity vertical about both the pitch and roll axes of an aircraft by providing for relative movement between the erecting device and the single bail pivotally mounted about the pitch axis of the aircraft. Of course, the single bail could equally well be pivotally mounted about the roll axis and have the carriage movable about the pitch axis. Also, other types of dashpots and erectors can be used satisfactorily for the disclosed purpose and the dashpot construction can be used in connection with an erector which is not acceleration responsive. Various other modifications are contemplated and may be resorted to by those skilled in the art, without departing from the spirit and scope of the invention as hereinafter defined by the appended claims.

What is claimed is:

1. In a gravity erected gyroscope for a movable craft, first gravity sensitive means mounted for movement about one axis of said craft and second gravity sensitive means slidably mounted on said first means for movement about another axis of said craft.

2. In a gravity erected gyroscope for a movable craft, first gravity sensitive means mounted for movement about one axis of said craft, second gravity sensitive means slidably mounted on said first means for movement about another axis of said craft and gyro erecting means carried by said second means to gravity erect said gyroscope about both said axes.

3. In a gravity erected gyroscope for a movable craft, a gravity sensitive bail pivotally mounted about the pitch axis of said craft and an erecting means slidably mounted on said bail for movement relative to said bail about the roll axis of said craft in response to the force of gravity.

4. In a gravity erected gyroscope for a movable craft, first gravity sensitive means mounted for movement about the pitch axis of said craft and second gravity sensitive means slidably mounted on said first means for movement about the roll axis of said craft.

5. In a gravity erected gyroscope for a movable craft, means for erecting said gyroscope to gravity vertical about the pitch axis and means for erecting said gyroscope to gravity vertical about the roll axis only through an angle about the roll axis approximately equal to the maximum out-of-trim conditions about the roll axis and for case erecting said gyroscope when the displacement of said craft about the roll axis exceeds the maximum out-of-trim conditions.

6. In a gravity erected gyroscope for a movable craft, gravity sensitive means mounted for movement relative to said craft about the roll axis only through an angle approximately corresponding to the maximum total deviation from the wing level position required to maintain straight flight of said craft, and erector means carried by said gravity sensitive means to gravity erect said gyroscope about the roll axis and thereby maintain straight flight.

7. In a gravity erected gyroscope for a movable craft, a dome section connected to the gyro rotor for rotation about the rotor spin axis, a gravity sensitive bail pivotally mounted about the pitch axis of said craft so that the plane of the bail lies in a gravity vertical plane, gravity sensitive means mounted on said bail for movement relative to said bail about the roll axis of said craft, and erector means mounted by said gravity sensitive means in position to coact with said dome and erect said gyroscope.

8. A gravity erected gyroscope as defined in claim 7 having means for interrupting the coaction between said erector means and said dome during turning movement of the craft.

9. A gravity erected gyroscope as defined in claim 7 having damping means connected between said bail and said gravity sensitive means.

10. In a gravity erected gyroscope for a movable craft, first gravity sensitive means mounted for movement about the pitch axis of said craft, second gravity sensitive means slidably mounted on said first means for relative movement thereto about the roll axis of said craft only through an angle approximately equal to the maximum total deviation from wing level position encountered in maintaining straight flight of said craft and erector means mounted on said second means for gravity erecting said gyroscope about the pitch and roll axis of said craft.

11. A gravity erected gyroscope as defined in claim 10 having means for freeing said gyroscope from said erector means during turning of said craft.

12. A gravity erected gyroscope as defined in claim 10 having damping means connected between said first and second gravity sensitive means.

13. In a gravity erected gyroscope for a movable craft, a dome section connected to the gyro rotor for rotation about the rotor spin axis, a gravity sensitive bail pivotally mounted about the pitch axis of said craft, a carriage slidably supported by said bail for limited movement relative to said bail about the roll axis of said craft, and erector means mounted on said carriage for coacting with said dome to gravity erect said gyroscope about the pitch and roll axes of said craft when said carriage is free to move relative to said bail.

14. A gravity erected gyroscope as defined in claim 13 having means for interrupting the coaction between said erector means and said dome during turning movement of the craft.

15. A gravity erected gyroscope as defined in claim 13 having damping means connected between said bail and said carriage.

16. An erecting device for a gyroscope comprising a gravity sensitive bail pivotally mounted about one axis of said gyroscope so that the plane of said bail lies in a gravity vertical plane, a gravity sensitive mass mounted on said bail for movement relative to said bail about another axis of said gyroscope in response to gravitational force and erecting means movable with said mass.

17. An erecting device for a gyroscope carried by a movable craft comprising a gravity sensitive bail pivotally mounted about the pitch axis of said craft so that said bail lies in a gravity vertical plane, a gravity sensitive mass mounted on said bail for movement relative to said bail about the roll axis of said craft in response to gravitational force, means for limiting the movement of said mass relative to said bail to an angle about the roll axis corresponding to maximum total deviation from wing level position required to maintain straight flight, and erecting means carried by said mass for gravity erecting said gyroscope about the roll axis when said mass is movable relative to said bail and for case erecting said gyroscope about the roll axis when said relative movement is prevented.

18. An erecting device for a gyroscope comprising first gravity sensitive means mounted for movement about one axis of said gyroscope and second gravity sensitive means supported by said first means for sliding movement along said first means about another axis of said gyroscope.

19. An erecting device for a gyroscope comprising a gravity sensitive bail mounted for movement about one axis of said gyroscope, said bail being provided with a supporting surface defining a path concentric with another axis of said gyroscope and a gravity sensitive mass mounted for movement relative to said bail along said supporting surface.

20. An erecting device for a gyroscope comprising a gravity sensitive bail having a body portion mounted by pivot points and a carriage portion mounted by said body portion for movement relative to said body portion, both said body portion and said carriage portion being movable about one axis of said gyroscope in response to gravitational force, said carriage portion being movable relative to said body portion about a second axis of said gyroscope in response to gravitational force and erecting means carried by said carriage portion to erect said gyroscope.

21. An erecting device for a gyroscope carried by a movable craft comprising a dome section connected to the gyro rotor for rotation about the rotor spin axis, a first gravity sensitive mass pivotally mounted about a first axis of said gyroscope, said first mass having a track for supporting and guiding the movement of a second gravity sensitive mass about a second axis of said gyroscope at right angles to said first axis and erector means carried by said second mass and coacting with said dome in order to gravity erect said gyroscope about both said first and second axes.

22. An erecting device as defined in claim 21 wherein said first axis is positioned to correspond with the pitch axis of said craft and said second axis is positioned to correspond with the roll axis of said craft.

23. An erecting device as defined in claim 22 having means for limiting the movement of said second mass along said track to an angle approximately corresponding to the maximum total deviation from wing level position required to maintain straight flight of said craft.

24. An erecting device for a gyroscope comprising first gravity sensitive means mounted for movement about the pitch axis of said craft, second gravity sensitive means supported by said first means for sliding movement along said first means about the roll axis of said craft and erecting means movable with said second means.

References Cited in the file of this patent

UNITED STATES PATENTS

| | | |
|---|---|---|
| 2,339,606 | Sias | Jan. 18, 1944 |
| 2,365,727 | Pike | Dec. 26, 1944 |

FOREIGN PATENTS

| | | |
|---|---|---|
| 837,057 | France | Nov. 3, 1938 |
| 945,956 | France | Dec. 6, 1938 |